United States Patent [19]
Kaifesh

[11] 3,762,057
[45] Oct. 2, 1973

[54] GAGE

[76] Inventor: Cass Kaifesh, 9947 Corella, Whittier, Calif.

[22] Filed: Jan. 27, 1971

[21] Appl. No.: 110,117

[52] U.S. Cl. .............................. 33/147 K, 33/178 R
[51] Int. Cl. ............................................... G01b 5/12
[58] Field of Search ...................... 33/178 R, 178 D, 33/178 E, 147, 148 R, 148 H

[56] References Cited
UNITED STATES PATENTS
3,257,729  6/1966  Fricke ................................ 33/147 J
3,302,295  2/1967  White ................................ 33/147 K

*Primary Examiner*—Robert B. Hull
*Assistant Examiner*—Richard R. Stearns
*Attorney*—Smyth, Roston & Pavitt

[57] ABSTRACT

A gage including a supporting structure, a first measuring element mounted on the supporting structure for movement relative thereto along a first path, a second measuring element mounted on the supporting structure for movement along a second path which is generally transverse to a line between the measuring elements. The second measuring element is generally diametrically opposite the first measuring element and accurate proper alignment of the measuring elements can be achieved by fixing the second measuring element in an appropriate position along the second path. The measuring elements are insertable into a cavity and an indicator is responsive to the position of the first measuring element along the first path to provide visual measuring information.

13 Claims, 7 Drawing Figures

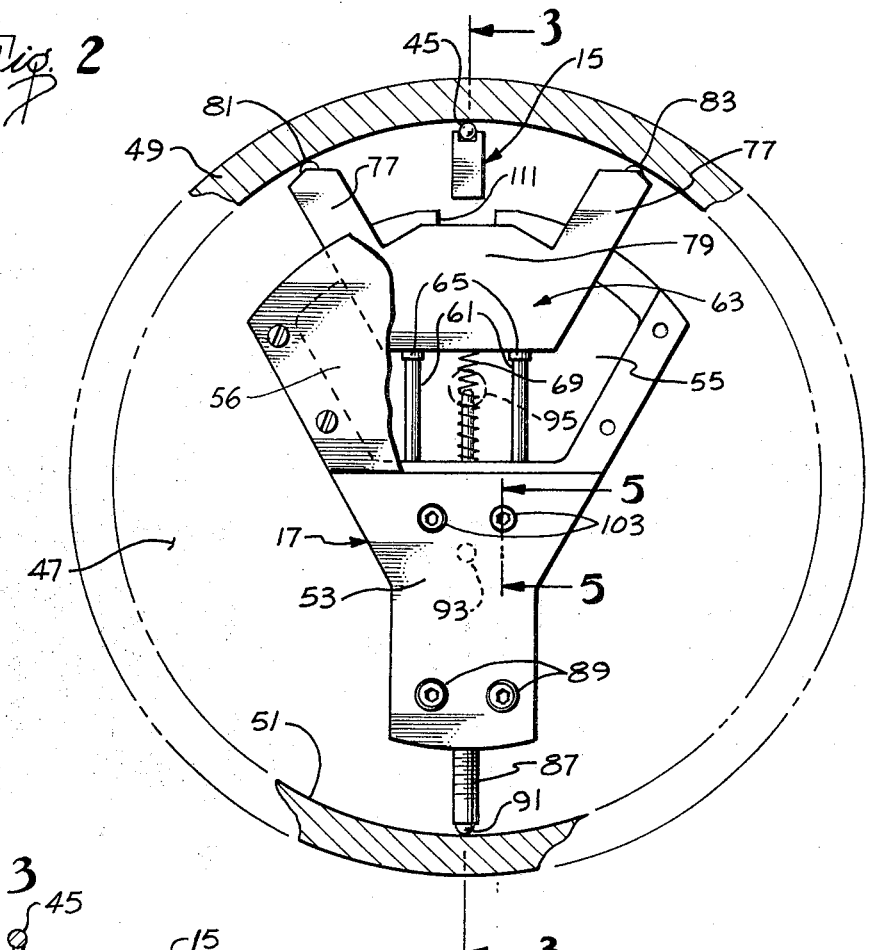
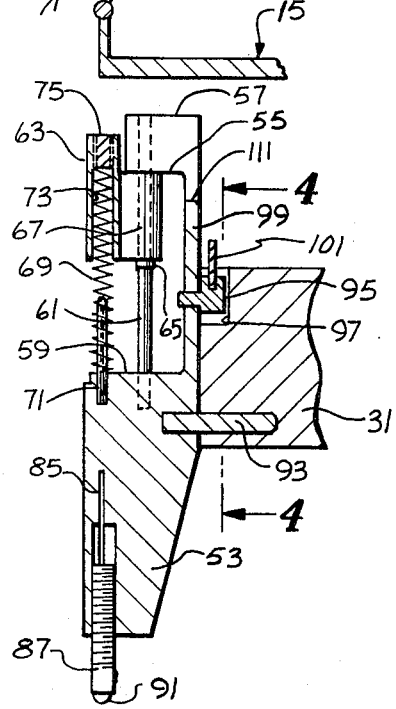
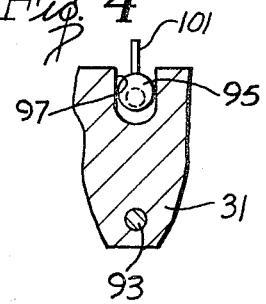
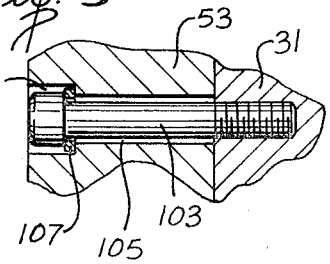
INVENTOR:
Cass Kaifesh
By: Smyth, Roston & Pavitt
ATTORNEYS

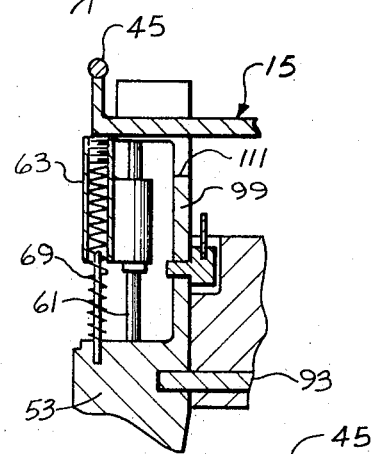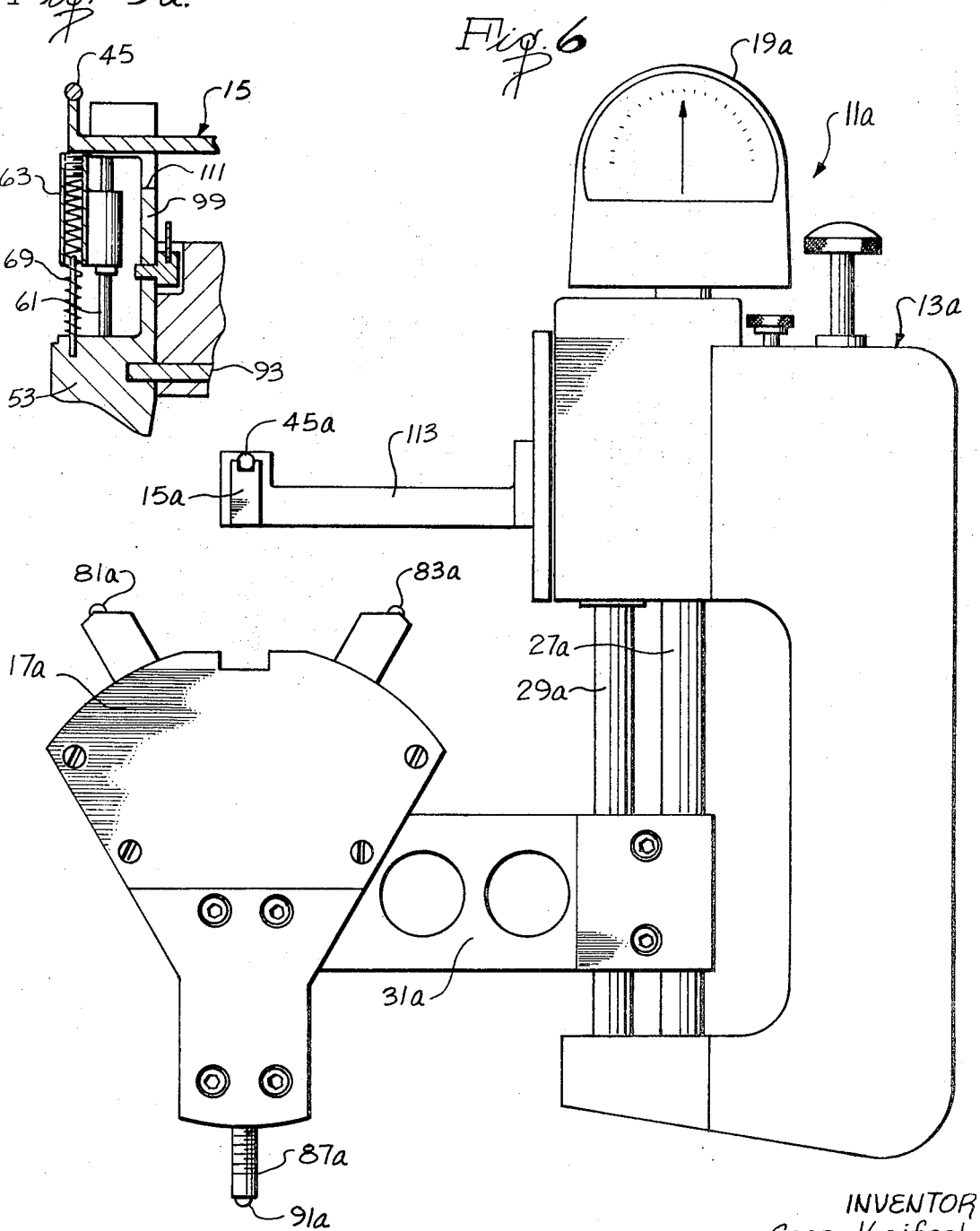

GAGE

BACKGROUND OF THE INVENTION

This invention relates to gages of the type useful in making various internal measurements such as bore diameters and diameters of internal grooves. One such gage is disclosed in my copending application Ser. No. 846,356 now U.S. Pat. No. 3,638,324. The present invention is directed to certain improvements and modifications in the gage described in the aforementioned patent application.

A gage for making internal measurements may include first and second measuring elements mounted on a supporting structure. One of the measuring elements is fixed and the other of the measuring elements is movable relative to the supporting structure generally toward and away from the fixed measuring element. The two measuring elements are placed in contact with the wall of the bore and an indicator provides visual measuring information.

In order to provide accurate internal diameter measurements, it is essential that the two measuring elements contact the wall of the bore at diametrically opposed points. Various factors such as production tolerances, handling and use of the gage, may cause the two measuring elements to become diametrically out of line. When this occurs, error is introduced into the measuring process.

In order to obtain an accurate measurement, it is essential that the two measuring elements be positioned in a diametral plane of the cavity or bore which is to be measured. This requires the workman to "search" in two directions in order to find a diametral plane. Specifically, the workman must pivot the gage about transverse radial axes in order to find a diametral plane. This two directional search is most difficult to perform, and it should be done by a skilled workman. Furthermore, it lengthens the time for taking the measurement.

SUMMARY OF THE INVENTION

The present invention provides a very accurate gage which produces accurate results even though it is operated by a relatively inexperienced workman. One concept of this invention is to provide a gage having first and second measuring elements which are accurately diametrically opposed to thereby provide an accurate diameter measurement. The relative position of the measuring elements circumferentially of the bore to be measured is manually adjustable to assure proper alignment for each group of bore sizes.

More particularly the measuring elements are mounted on a supporting structure. The first measuring element is mounted for movement along a first path relative to the supporting structure generally toward and away from the second measuring element. The second measuring element is mounted on the supporting structure for movement along a second path which is generally transverse to the first path and which is generally in a diametral plane of the bore to be measured. By moving the second measuring element along the second path, the two measuring elements can be moved into diametrically opposite positions in the cavity which is being measured. The second measuring element can advantageously be mounted for pivotal movement about a pivotal axis which extends generally axially of the cavity to be measured to thereby provide for the movement of the second measuring element along the second path.

The present invention also provides a novel centering device which facilitates the "search" for a diametral plane. The centering device includes three circumferentially spaced contacts which are insertable with the movable measuring element into the cavity to be measured and into engagement with the wall of the cavity. The three contacts define a plane so that the workman can locate a diametral plane by a unidirectional search which can be a simple rocking or sawing motion.

A feature of the invention is the integration of the centering device and the accuracy producing feature described hereinabove. To accomplish this, the centering device also includes a body having the three contacts mounted thereon. The first and second contacts are mounted for movement relative to the body and to the third contact to vary the spacing between the first and second contacts and the third contact to thereby adapt the centering device for insertion into cavities of different diameters. Biasing means urges the first and second contacts away from the third contact.

The body is mounted on the supporting structure with the movable measuring element lying intermediate the first and second contacts and with the third contact being generally diametrically opposite the movable measuring element. With this construction, the third contact serves not only as the third contact of the centering device but also as a portion of the second or fixed measuring element.

To provide for movement of the third contact, i.e., the fixed measuring element, the entire body is preferably mounted on the supporting structure for movement about a pivotal axis which extends generally transverse to a line between the measuring elements and generally axially of the cavity to be measured. Movement of the body about the pivotal axis moves all three of the contacts to thereby bring the measuring elements into proper alignment. Movement of the entire centering device is simpler than providing for movement of one of the measuring elements alone. Pivotal movement about the pivotal axis can be advantageously imparted to the body by a cam and cam follower mounted on the body and the suppporting structure, respectively.

An actuator is provided on the body to automatically depress the movable measuring element, i.e., to move the movable measuring element generally toward the fixed measuring element. With the present invention, the actuator is used to move both the movable measuring element and the first and second contacts toward the fixed measuring element.

The invention can best be understood by reference to the following description taken in connection with the accompanying illustrative drawings.

BRIEF DESCRIPTION OF THE DRAWINGS

FIG. 2 is an end elevational view of the centering device and movable measuring element with these members being utilized to measure the diameter of a bore.

FIG. 3 is a fragmentary sectional view taken generally along line 3—3 of FIG. 2.

FIG. 3a is a fragmentary sectional view similar to FIG. 3 but on a reduced scale showing the movable measuring element and two of the contacts of the cen-

Figure 1:
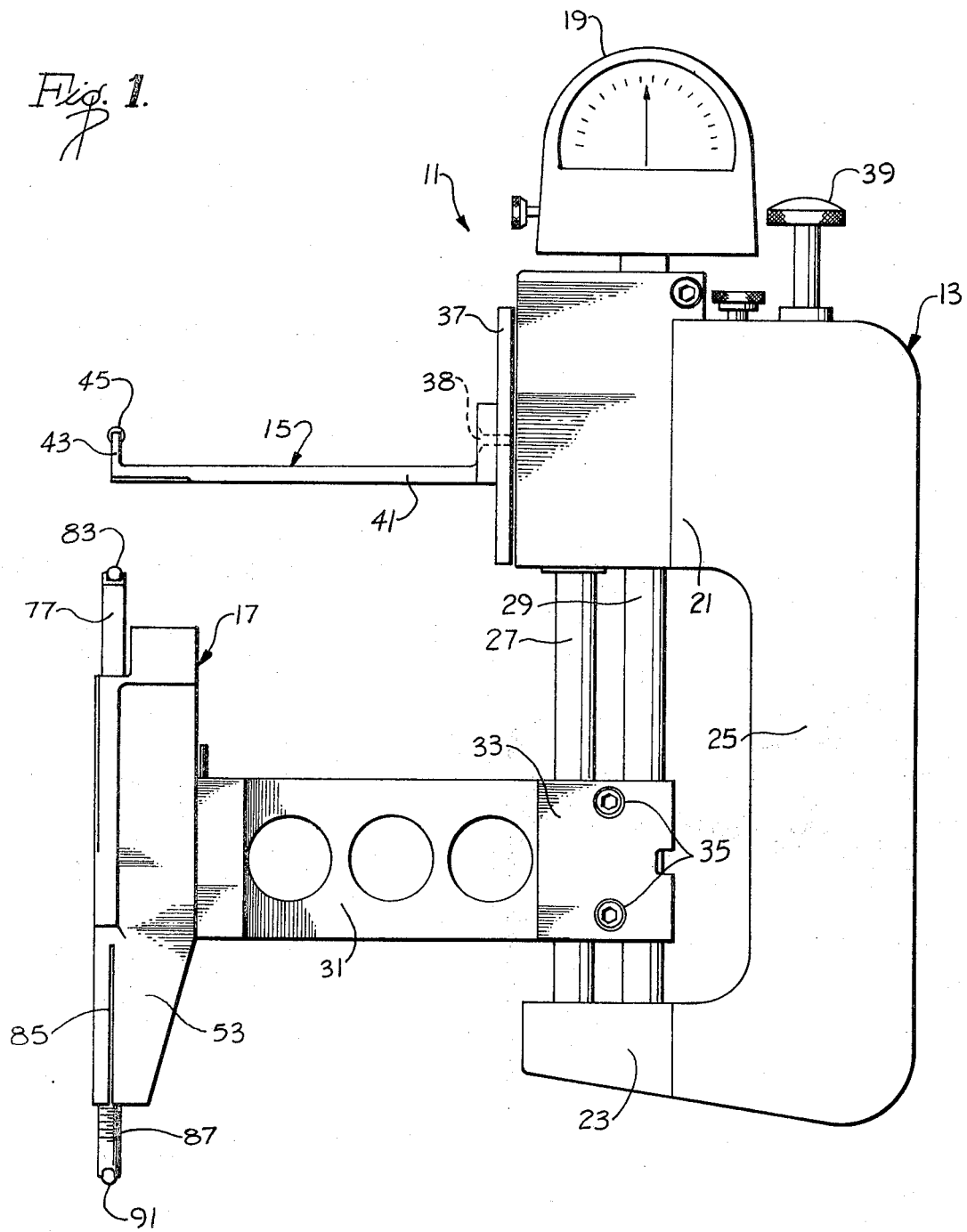
FIG. 1 is a side elevational view of a gage constructed in accordance with the teachings of this invention.

3 tering device urged inwardly to permit insertion into a bore.

FIG. 4 is a fragmentary sectional view taken generally along line 4—4 of FIG. 3 and illustrating the cam for moving the centering device.

FIG. 5 is an enlarged fragmentary sectional view illustrating the manner of affixing the centering device to the supporting structure.

FIG. 6 is a side elevational view similar to FIG. 1 showing a modified form of the invention.

DESCRIPTION OF THE PREFERRED EMBODIMENTS

FIG. 1 shows a gage 11 constructed in accordance with the teachings of this invention. The gage 11 includes a frame or supporting structure 13, a movable measuring element or finger element 15, a centering device 17 and an indicator 19. The supporting structure 13 includes spaced, generally parallel leg sections 21 and 23 interconnected by a web 25 which defines a handle for the gage 11. A pair of parallel rods 27 and 29 are rigidly mounted on the leg sections 21 and 23 and extend therebetween in parallel relationship.

A supporting arm 31 is mounted on the rods 27 and 29 by a clamp 33 and may be considered to form a portion of the supporting structure in that it has the centering device 17 mounted thereon in a manner described hereinbelow. The position of the arm 31 along the rods 27 and 29 can be adjusted by loosening of the screws 35 of the clamp to permit sliding of the arm 31 and clamp 33 along the rod to the desired location whereupon the screws can be tightened to rigidly and fixedly mount the arm on the rods. The arm 31 extends perpendicular to the parallel rods 27 and 29.

The movable measuring element 15 is removably mounted on a holder 37 by a screw 38. The holder 37 mounts the measuring element 15 on the rod 27 of the supporting structure 13 for movement along a path parallel to the rods 27 and 29. The movable measuring element 15 is biased upwardly, i.e., away from the centering device 17 by a spring (not shown) carried by the supporting structure 13. The measuring element 15 is drivingly connected to an actuator 39 which is mounted for movement on the supporting structure 13. By depressing the actuator 39, the movable measuring element 15 can be moved toward the centering device 17 against the biasing force of the spring. The internal construction of the supporting structure, the mounting of the holder 37 on the rod 27 and the operation of the actuator 39 to move the measuring element 15 may be in accordance with my copending application Ser. No. 846,356 now U.S. Pat. No. 3,638,324.

The movable measuring element 15 includes an elongated arm 41 perpendicular to the rods 27 and 29 and parallel to the arm 31 and a flange 43 perpendicular to the arm 41 and extending away from the centering device 17. The flange 43 carries a contact or ball 45 crimped in a groove thereof as shown in FIG. 2.

The indicator 19 is mounted on the supporting structure 13 and functions substantially as described in my above-identified copending application Ser. No. 846,356 now U.S. Pat. No. 3,638,324. Specifically, the indicator 19 furnishes an indication which varies in accordance with the position of the movable measuring element 15.

The gage 11 is adapted to measure internal dimensions of a bore or cavity. As shown in FIG. 2, the movable finger element 15 and the centering device 17 can be inserted within a cavity or bore 47 of a pipe 49. In the embodiment illustrated, the pipe 49 has an inner cylindrical wall 51 which defines the bore 47.

With reference to FIGS. 1–3, the centering device 17 includes a body 53 having a recess 55 therein which is closed by a cover plate 56. The recess 55 has an upper wall 57 and a lower wall 59. A pair of spaced, parallel pins 61 are pressed into the walls 57 and 59 and extend therebetween. A mounting member 63 is mounted on the pins 61 by a pair of sleeve bearings 65 with the sleeve bearings being mounted in rearwardly offset lugs 67, respectively, as shown in FIG. 3. The body 53 and the mounting member 63 are preferably constructed of a metal such as anodized aluminum. The pins 61 are parallel to the rods 27 and 29 so that the mounting member 63 is mounted for movement parallel to the rods and parallel to the path of movement of the movable measuring element 15.

A spring 69, which is mounted on a guide pin 71 pressed into the lower wall 59 of the body 55 urges the mounting member 63 upwardly along the pins 61. The lugs 67 engage the wall 57 to define the uppermost position of the mounting member 63. The upper end of the spring 69 is received in a bore 73 of the mounting member 63, and the force of the spring can be adjusted by a set screw 75 mounted in the bore 73.

The mounting member 63 has a pair of generally radially extending arms 77 (FIG. 2) joined by a connector section 79. The arms 77 carry contacts 81 and 83 with each of the contacts being in a form of a ball crimped into a groove in its associated arm 77. As shown in FIG. 2, the contacts 81 and 83 are equidistant from movable measuring element 15 and are located on opposite sides thereof.

As shown in FIG. 3, the lower end of the body 53 is split along a plane 85 to define a clamp. A screw 87 is threadedly received by the clamp, and the clamp can be tightened by tightening a pair of screws 89 (FIG. 2) to thereby cause the clamp to frictionally engage the screw 87 with sufficient force to prevent movement thereof relative to the body 53. A contact 91 in the form of a ball is carried by the lower end of the screw 87 and is suitably retained therein as by crimping. As shown in FIG. 2, the contact 91 is diametrically opposite the ball 45 of the measuring element 15 and serves as the contact for the fixed measuring element, i.e., the gage makes a measurement based on the distance between the contact 91 and the ball 45. The fixed measuring element, i.e., the screw 87 and the contact 91 is fixed in the sense that it is fixed to the supporting structure 13 during the measuring operation. The contacts 81, 83 and 91 and the ball 45 are in the same plane. The balls 45 and 91 engage the wall 51 with the zones of engagement defining contact locations.

The centering device 17 is mounted on the arm 31 for pivotal movement by a pivot pin 93. The pivot pin 93 is pressed into the body 53 and is rotatably received within a bore in the arm 31. The pivotal axis defined by the pin 93 is perpendicular to the rods 27 and 29 and parallel to the movable measuring element 15 and to the axis of the bore 47. As shown in FIG. 2, the pin 93 and hence the pivotal axis is equidistant from the contacts 81 and 83, and when the body 53 is properly oriented, the pin 93 lies on a diametral line between the contact 91 and the ball 45.

The pivotal movement of the centering device 17 about the pin 93 is controlled by a cam 95 and a cam follower 97 as shown in FIGS. 3 and 4. The cam 95 is in the form of an eccentric mounted on a back wall 99 of the recess 55 for rotation relative to the body 53, such rotation being facilitated by a stem 101 projecting radially of the cam. The cam follower 97 is in the form of a groove in the arm 31 with the cam 95 being seated in the groove. By moving the stem 101 to rotate the cam 95, the operator can control the angular position of the centering device 17, the ball 91 and the zone of engagement between the ball 91 and the wall 51 about the axis defined by the pivot pin 93.

To firmly mount the centering device 17 on the arm 31 and to firmly fix the centering device in the angular posiiton selected by the cam 95, a pair of screws 103 (FIGS. 2 and 5) are utilized. FIG. 5 shows a typical construction wherein one of the screws 103 projects through an over-sized bore 105 in the body 53 and into the arm 31. A spring 107 in the form of a lockwasher is seated against a shoulder of an over-sized counterbore 109. The spring 107 urges the screw axially outwardly. The clearance between the screw 103 and the bore 105 and the counterbore 109 is sufficient to accommodate the limited pivotal movement of the body 53 caused by rotation of the cam 95. Even though there is peripheral clearance around the screw 103, the force of friction between the spring 107 and the head of the screw and the body 53 is sufficient to firmly retain the centering device 17 in the position selected by the cam.

The back wall 99 of the body 53 has a notch 111 therein (FIGS. 2, 3, and 3a) immediately beneath the outer end of the movable measuring element 15. When the actuator 39 (FIG. 1) is depressed, it moves the movable measuring element 15 from the position shown in FIG. 3 to the position shown in FIG. 3a. During the initial phase of its downward travel, the movable measuring element 15 enters the notch 111 and its outer end bears against the upper end of the mounting member 63 whereupon further downward movement of the movable measuring element causes the mounting member 63 to be moved downwardly against the biasing force of the spring 69. This facilitates insertion of the movable measuring element 15 and the centering device 17 into the bore 47 (FIG. 2).

In operation of the gage 11, the position of the arm 31 along the rods 27 and 29 is adjusted roughly for the size of bore which is to be measured. Next, the operator slightly loosens the screws 103 until only light spring pressure from the spring 107 acts against the body 53. The centering device 17 is then retained in position by the pivot pin 93, the cam 57, and cam follower 97, the screws 103 and the springs 107.

The actuator 39 is then depressed to move the measuring element 15 to the position shown in FIG. 3a. This moves the contacts 81 and 83 inwardly to facilitates insertion of the contacts 81, 83 and 91 and the measuring element 15 into the bore 47. The actuator 39 is then released and the contacts 81 and 83 are moved outwardly by the spring 69. The measuring element 15 is moved radially outwardly away from the contact 91 by its spring (not shown) which is contained within the supporting structure 13.

The three contacts 81, 83 and 91 define a plane which facilitates positioning of the gage about a vertically extending axis in FIG. 2. Specifically, all of the contacts 81, 83 and 91 will not engage the inner wall 51 of the bore 47 if the gage is turned or cocked about a vertically extending axis in FIG. 2. The workman then may pivot the gage about a horizontal axis which intersects the point of contact between the contact 91 and the wall 51 while continuously noting the readings on the indicator 19. When the indicator 19 gives the smallest reading, the operator knows that the contacts 81, 83 and 91 and the ball 45 are located in a diametral plane within the bore 47. The reading thus obtained is the diameter of the bore; provided, however, that the contact 91 and the ball 45 are located along a diameter of the bore 47.

Due to manufacturing tolerances, handling and use of the gage, etc., the contact 91 and the ball 45 may not be accurately diametrically opposed at the particular diameter of the bore 47. To make the gage 11 more accurate for reading each particular group of bore sizes, the present invention provides the cam 95 and the pivot pin 93. The operator rotates the cam 95 to pivot the centering device 17 including the contacts 81, 83 and 91 about the pivot pin 93. The contact 91 moves transversely of the axis of the bore 47 as viewed in FIG. 2 and transversely of the ball 45 which remains stationary with the supporting structure 13. As the cam 95 is rotated, the reading on the indicator is observed and when the highest reading is obtained, the contact 91 is diametrically opposed to the ball 45 because the diameter is the longest line in a diametral plane. The centering device 17 and the measuring element 15 are then withdrawn from the bore 47, and the screws 103 are tightened to positively prevent inadvertent pivotal movement of the centering device relative to the supporting structure 13. The gage 11 is then properly set for measuring bores having a diameter approximating the diameter of the bore 47.

FIG. 6 shows a gage 11a which represents a second embodiment of the present invention. The gage 11a is identical to the gage 11 in every way not specifically noted herein and corresponding parts are designated by corresponding reference characters followed by the letter a.

The gage 11 is identical to the gage 11a except that the latter has means for mounting the movable measuring element 15a and the centering device 17a in positions offset 90° from the position shown in FIG. 1. The centering device 17 is angularly offset by providing a supporting arm 31a which contains a right angle bend. The measuring element 15a is similarly offset by a support arm 113 which contains a right angle bend. Preferably the arms 31a and 113 project the measuring element 15a and the centering device 17a a substantial distance from the plane of the rods 27a and 29a. An advantage of the construction shown in FIG. 6 is that a downwardly opening bore can be measured with the indicator 19a and the supporting structure 13a being in a convenient horizontal position.

Although exemplary embodiments of the invention have been shown and described, many changes, modifications, and substitutions may be made by one having ordinary skill in the art without necessarily departing from the spirit and scope of this invention.

I claim:

1. A gage engageable with first and second surface regions of a workpiece for providing a measurement comprising:

a supporting structure;

a first measuring element including a contact engageable with the first surface region with the zone of contact between said contact and said first surface region defining a contact location;

means for mounting said first measuring element on the supporting structure for movement relative thereto with said contact of said first measuring element moving along a first path;

a second measuring element including a contact engageable with the second surface region with the zone of contact between said second surface region and the last mentioned contact defining a contact location;

means for mounting said second measuring element on said supporting structure generally in alignment with said first path;

the mounting means for one of said measuring elements including means for mounting the contact of said one measuring element for movement relative to said supporting structure along a second path which is generally transverse to a line extending between said contacts of said measuring elements, such movement of said contact of said one measuring element moving the associated contact location;

indicator means responsive to the position of said first measuring element along said first path for providing an indication of said measurement;

means for controllably moving said contact of said one measuring element along said second path whereby said contact of said second measuring element and said first path can be accurately aligned; and means for fixing said contact of said one measuring element in any one of a plurality of positions along said second path.

2. A gage as defined in claim 1 wherein said means for controllably moving includes cam means for moving the contact of said one measuring element along said second path.

3. A gage as defined in claim 1 wherein said one measuring element is said second measuring element.

4. A gage as defined in claim 1 wherein said one measuring element is said second measuring element and the mounting means therefor includes a body and means for pivotally mounting said body on said supporting structure, said means for controllably moving including cam means cooperating with said body and said supporting structure for pivoting said body.

5. A gage as defined in claim 4 wherein said means for fixing includes a screw and an over-sized bore in said body, said screw extending through said bore and into said supporting structure with said bore having a sufficiently large cross sectional area to allow limited pivotal movement of said body relative to said supporting structure, said screw being tightenable to fix said body in any one of a plurality of positions.

6. A gage for providing a measurement of a cavity defined by an arcuate wall comprising:
   a supporting structure;
   a first measuring element including a contact engageable with the wall;
   means for mounting said first measuring element on the supporting structure for movement relative thereto along a first path;
   a second measuring element including a contact engageable with the wall;
   means for mounting said second measuring element on said supporting structure;
   the mounting means for one of said measuring elements including means for mounting the contact of said one measuring element for movement relative to said supporting structure along a second path which is generally transverse to said first path and which extends generally circumferentially of said cavity when the measuring elements are inserted into the cavity to provide said measurement, such movement of such contact along said second path allowing said contacts to be positioned in the same diametral plane;
   indicator means responsive to the position of said first measuring element along said first path for providing an indication of said measurement;
   means for controllably moving said contact of said one measuring element along said second path; and
   means for fixing said contact of said one measuring element in any one of a plurality of positions along said second path.

7. A gage adapted to make a measurement of a cavity wherein said cavity is defined by arcuate wall means, said gage comprising:
   a supporting structure;
   a first measuring element;
   means for mounting said measuring elements on the supporting structure for movement along a first generally rectilinear path;
   a centering device;
   said centering device including a body, at least three circumferentially spaced contacts, means for mounting said contacts on said body with at least a first of said contacts being movable relative to said body to vary the distance between said first contact and a second of said contacts to thereby facilitate insertion of said contacts into cavities of different sizes;
   means for mounting said body on said supporting structure for pivotal movement of said body relative to the supporting structure about a pivotal axis, said pivotal axis extending generally transverse to said first path;
   means for fixing said body in any one of a plurality of positions about said pivotal axis;
   said second contact being generally aligned with said first path; and
   indicator means responsive to the position of said first measuring element relative to said second contact for providing an indication of said measurement.

8. A gage as defined in claim 7 including cam means for moving said body about said axis, said cam means including a cam mounted for movement on one of said body and said supporting structure and a cam follower mounted on the other of said body and said supporting structure.

9. A gage adapted to make a measurement of a cavity wherein the cavity is defined by arcuate wall means comprising:
   a supporting structure;
   a measuring element;
   means for mounting said measuring element on said supporting structure for movement along a first path relative to said supporting structure;
   a centering device including a body, at least three circumferentially spaced contacts, means for mounting said contacts on said body with first and second of said contacts being movable to vary the distance between said first and second contacts and a third of said contacts to thereby facilitate insertion of said contacts into cavities of different sizes, and biasing means for urging said first and second contacts away from said third contact;

the movement of said measuring element along said first path being generally toward and away from said third contact;

means for mounting said body on said supporting structure, said first and second contacts being on opposite sides of said measuring element and said third contact being generally diametrically opposite said measuring element, said measuring element and said contacts being insertable into said cavity and into engagement with the wall thereof;

indicator means responsive to the position of said measuring element relative to the third contact for providing a measurement of said cavity;

an actuator mounted on said supporting structure for movement relative thereto;

means drivingly connecting said actuator and said measuring element whereby movement of said actuator moves said measuring element along said first path; and a mounting member interconnecting said first and second contacts for movement together, at least a portion of said mounting member lying along said first path whereby movement of said actuator to move said measuring element generally closer to said third contact causes said finger element to engage said mounting member to thereby move said first and second contacts to reduce the distance between the first and second contacts and the third contact.

10. A gage as defined in claim 9 wherein said mounting member carries said first and second contacts and means for mounting said mounting member on said body for movement toward and away from said third contact, said biasing means urging said mounting member generally away from said third contact.

11. A gage as defined in claim 9 including means for mounting said third contact on said body for movement relative to said body in a direction generally toward and away from said measuring element and means for fixing said third contact in any one of a plurality of positions relative to said body.

12. A gage as defined in claim 9 including means for adjusting the biasing force of said biasing means.

13. A gage as defined in claim 9 wherein said body mounting means mounts said body for movement about a pivotal axis which is generally transverse to said first path, said body being pivotal about said pivotal axis to adjust the circumferential location of said contacts relative to said measuring element, said gage including means for fixing said body in any one of a plurality of different positions about said pivotal axis.

* * * * *